3,703,409
AMINOBENZOIC ACID SULFATES AS INTUMESCENT AGENTS

Shirley H. Roth, Highland Park, N.J., assignor to Cities Service Company, New York, N.Y.
No Drawing. Filed Dec. 28, 1970, Ser. No. 102,241
Int. Cl. C09d 5/18; C09k 3/28
U.S. Cl. 117—136                                    2 Claims

ABSTRACT OF THE DISCLOSURE

Aminobenzoic acid sulfates, such as 2-amino-5-chloro benzoic acid sulfate, are used as intumescent agents dispersed in a binder and coated on a substrate.

BACKGROUND OF THE INVENTION

At present there are available paints which, when applied to a surface and subjected to heat, will intumesce and expand. Conventional commercial prior art intumescent compositions have relied on a combination of three different classes of ingredients; carbonifics, spumifics, and catalysts to form the foamed char. The expanded material, being of a porous heat insulating character, provides a degree of protection against heat transfer, flame, etc. Unfortunately, however, the previously available intumescent paints have proved troublesome to manufacture due to the difficulty in formulating and balancing the three components described. This invention relates to a single component intumescent agent which will decompose on heating to yield an insulative char providing satisfactory protection against heat and flame.

SUMMARY OF THE INVENTION

It has now been found that certain aminobenzoic acid sulfates having the following structural formula

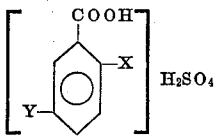

wherein X is halogen or amino and Y is halogen, amino, or hydrogen, are useful as intumescent agents.

In a preferred embodiment, the molar ratio of aminobenzoic acid to sulfuric acid is 1:1, although other ratios can be employed. Additionally, instead of sulfuric acid, sulfonic acids can often be employed for example, the benzene and toluene sulfonic acids.

As indicated, the intumescent agents of this invention comprise the aminobenzoic acid sulfates. Preferred aminobenzoic acid sulfates are 2-amino-5-chlorobenzoic acid sulfate, 5-amino-2-chlorobenzoic acid sulfate and anthranilic acid sulfate. These compounds all intumesce to an acceptable degree. Unfortunately, however, not all aminobenzoic acid sulfates are intumescent agents. Thus, it has been found that 5-amino-2-nitrobenzoic acid sulfate (X is nitro and Y is amine in the above structural formula) does not intumesce. Additionally, the requirement that the aminobenzoic acid sulfate be used is borne out by the fact that anthranilic acid itself is not an intumescent agent under the conditions employed herein.

The compounds described herein, i.e., aminobenzoic acid sulfates, are powdery or crystalline solids and therefore require a vehicle to be applied as a paint. Proper selection of a vehicle is frequently important. Generally, the vehicles or binders which are well-known in the paint and varnish arts can be used. Thus, such binders as cellulose nitrates of the grade commonly used for lacquers are useful binders. In addition there can be used the various synthetic polymers or copolymers which are well-known in the paint and varnish arts including polyvinyl chloride, polyvinyl chloride copolymers with other polymerizable vinyl compounds, polyvinyl acetate, oil modified phenolic resin binders, etc. The selected vehicle should be one which undergoes chemical decomposition without explosion at a temperature of about 150 to 250° C. or which is thermoplastic at such temperatures. In either case, the vehicle does not interfere with the intumescence, as would a vehicle which remains rigid at such temperatures.

The aminobenzoic acid sulfate can be dispersed in a suitable binder in an amount of from about 4 to about 10 parts of said compound per part of binder, with solvent being added as required. The paint or coating formulation can vary broadly to provide a paint containing from about 10% to about 70% by weight of solids, of which from about 3% to about 30% is binder. Thus, the paint formulation can contain from about 7% to about 70% by weight of intumescent composition to provide a dry coating which can contain from about 7% to about 70% by weight of intumescent agent.

Paints prepared in this manner are adherent to many types of surfaces, for example wood, paper, asbestos, aluminum, and steel (even when primed with zinc chromate). When a surface coated with such a paint or film is heated, as by fire, the paint will intumesce to a very high degree. In so doing, a black polymer consisting of closed carbonaceous cells having a high degree of heat resistance, thermal stability and low thermal conductivity is formed. The volatile product of this intumescence is, for the most part water, sulfur dioxide, nitrogen, ammonia, carbon dioxide and, where halogen is present in the molecule, the hydrogen halide.

It has been theorized that the reactions which occur during the intumescence of the compounds described herein are intermolecular condensation reactions involving the functional groups to link and condense rings and to form new rings. Sulfuric acid is eventually reduced to sulfur dioxide during intumescence and becomes part of the volatile gases. The carboxyl group similarly evolves $CO_2$.

The yield of the foamed char depends upon the time of heating, the degree of flame exposure, etc. Yields of 25 to 55% are common.

Generally, the sulfates and sulfonates of the aminobenzoic acid compounds are used where at least one position in ortho relation to the amino group is open. In addition, the benzene ring can be substituted by one or more additional benzene nuclei which in turn can contain additional amino or halogen groups. In addition the aromatic nucleus can be substituted by one or more nitrogen containing heterocyclic rings which in turn can be substituted as described above. In some cases the position ortho to the amino group can be occupied provided that this constituent can be easily removed by heating, as exemplified by decarboxylation.

Example

One gram of each of the compounds described below was placed in an aluminum dish and flamed with a propane torch in order to determine intumescence. The results are described below.

| Compound | Intumescence |
|---|---|
| (1) 5-amino-2-chlorobenzoic acid sulfate | Yes. |
| (2) 2-amino-5-chlorobenzoic acid sulfate | Yes. |
| (3) Anthranilic acid sulfate | Yes. |
| (4) 5-amino-2-nitrobenzoic acid sulfate | No. |
| (5) Anthranilic acid | No. |

From the foregoing it is apparent that the aminobenzoic acid must be present in the form of sulfate for intumescence to take place, as can be seen from the fact that anthranilic acid does not intumesce. From the fact that 5-amino-2-nitrobenzoic acid sulfate does not intumesce, it can be seen that not all derivatives work.

The intumescent agents of this invention can either be purchased in the form of the sulfate or in the acid form and then converted to the sulfate by reaction with an equimolar amount of sulfuric acid. One convenient source of these intumescent agents or their precursors is Aldrich Chemical Company, Milwaukee, Wis.

Therefore, I claim:

1. An intumescent composition comprising about 4–10 parts by weight of an intumescent agent selected from 2-amino-5-chlorobenzoic acid sulfate, 5-amino-2-chlorobenzoic acid sulfate, and anthranilic acid sulfate dispersed in one part by weight of a binder.

2. An article comprising a substrate coated with a paint composition containing an intumescent agent selected from 2-amino-5-chlorobenzoic acid sulfate, 5-amino-2-chlorobenzoic acid sulfate, and anthranilic acid sulfate.

References Cited

UNITED STATES PATENTS

| | | | |
|---|---|---|---|
| 3,535,130 | 10/1970 | Webb | 117—136 X |
| 2,912,393 | 11/1959 | Stilbert et al. | 117—136 X |
| 3,336,153 | 8/1967 | Juda | 117—136 X |
| 2,100,242 | 11/1937 | Deese | 260—518 |
| 2,653,971 | 9/1953 | Balch | 260—518 |
| 3,505,389 | 4/1970 | Weil et al. | 260—518 X |
| 3,257,191 | 6/1966 | Weil et al. | 260—518 X |

WILLIAM D. MARTIN, Primary Examiner

H. J. GWINNELL, Assistant Examiner

U.S. Cl. X.R.

106—15 FP